(12) United States Patent
Schmidt et al.

(10) Patent No.: US 11,459,044 B2
(45) Date of Patent: Oct. 4, 2022

(54) MICROTRANSPORTERS (71) Applicant: Ford Global Technologies, LLC, Dearborn, MI (US)

(72) Inventors: Eike Schmidt, Cologne (DE); Maximilian Julius Engelke, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1046 days.

(21) Appl. No.: 16/087,366

(22) PCT Filed: Jul. 12, 2016

(86) PCT No.: PCT/US2016/041863
§ 371 (c)(1),
(2) Date: Sep. 21, 2018

(87) PCT Pub. No.: WO2017/164909
PCT Pub. Date: Sep. 28, 2017

(65) Prior Publication Data
US 2021/0046984 A1 Feb. 18, 2021

Related U.S. Application Data (60) Provisional application No. 62/311,514, filed on Mar. 22, 2016.

(51) Int. Cl.
*B62D 61/08* (2006.01)
*B60L 53/16* (2019.01)
(Continued)

(52) U.S. Cl.
CPC ............... *B62D 61/08* (2013.01); *B60K 1/00* (2013.01); *B60L 53/16* (2019.02); *B60L 53/18* (2019.02);
(Continued)

(58) Field of Classification Search
CPC .......... B62D 61/08; B62D 61/06; B60K 1/00; B60L 53/16; B60L 53/18; B60L 2200/28;
(Continued)

(56) References Cited

U.S. PATENT DOCUMENTS 2,007,447 A   7/1935   Johnson
2,992,035 A   7/1961   Tell et al.
(Continued)

FOREIGN PATENT DOCUMENTS

CN   201800541 U   4/2011

OTHER PUBLICATIONS

CN Notification of Second Office Action dated Jun. 7, 2021 re Application No. 2016800837687.
(Continued)

*Primary Examiner* — Minnah L Seoh
*Assistant Examiner* — Marlon A Arce
(74) *Attorney, Agent, or Firm* — Brandon Hicks; Bejin Bieneman PLC (57) ABSTRACT

A microtransporter system includes a plurality of microtransporters and a housing. The microtransporters each include a rigid base structure, three wheels rotatably mounted in the base structure, an electric motor drivingly connected to one of the wheels, and a load support surface connected to the base structure. The housing includes a storage chamber sized to store a plurality of microtransporters, and a passageway connecting the chamber to an outside of the housing.

18 Claims, 4 Drawing Sheets

(51) Int. Cl.
  *B60L 53/18* (2019.01)
  *B60K 1/00* (2006.01)
  *B60P 3/07* (2006.01)
  *B60R 11/02* (2006.01)
  *B60R 11/04* (2006.01)
  *B60R 11/00* (2006.01)

(52) U.S. Cl.
  CPC ............ *B60P 3/07* (2013.01); *B60R 11/0217* (2013.01); *B60R 11/04* (2013.01); *B60L 2200/28* (2013.01); *B60L 2200/36* (2013.01); *B60R 2011/0043* (2013.01)

(58) Field of Classification Search
  CPC ........ B60L 2200/36; B60L 53/32; B60P 3/07; B60P 3/00; B60R 11/0217; B60R 11/04; B60R 2011/0043; H02J 7/0013; H02J 2310/40; H02J 7/0044; H02J 7/02; H02J 2207/20; H02J 7/022; Y02T 10/70; Y02T 90/12; Y02T 10/7072; Y02T 90/14
  See application file for complete search history.

(56) References Cited

U.S. PATENT DOCUMENTS

| | | | |
|---|---|---|---|
| 4,932,489 A | 6/1990 | Evans et al. | |
| 5,938,710 A | 8/1999 | Lanza et al. | |
| 6,502,657 B2 | 1/2003 | Kerrebrock et al. | |
| 6,883,201 B2 | 4/2005 | Jones et al. | |
| 7,011,171 B1 | 3/2006 | Poulter | |
| 7,351,066 B2 | 4/2008 | DiFonzo et al. | |
| 7,802,802 B2 | 9/2010 | Gordon | |
| 10,293,676 B2 * | 5/2019 | Schnapp | B60K 1/04 |
| 10,737,580 B2 * | 8/2020 | Aiuchi | B60L 53/14 |
| 11,077,546 B2 * | 8/2021 | Jung | B25J 5/007 |
| 2004/0090206 A1 | 5/2004 | Choi | |
| 2009/0266773 A1 | 10/2009 | Janeczko | |
| 2011/0106362 A1 | 5/2011 | Seitz | |
| 2014/0205401 A1 | 7/2014 | Bryant et al. | |
| 2014/0238762 A1 | 8/2014 | Berberian et al. | |
| 2015/0005987 A1 | 1/2015 | Khorsheed et al. | |
| 2015/0012163 A1 | 1/2015 | Crawley | |
| 2015/0028797 A1 | 1/2015 | Miller et al. | |
| 2015/0202770 A1 | 7/2015 | Patron et al. | |

OTHER PUBLICATIONS

Robot MarketPlace, "FiveBOT FB003 Three Omni-Wheel Robotic Platform", Mar. 23, 2016, http://www.robotmarketplace.com/products/0-FB003.html.

International Search Report dated Sep. 23, 2016 re Appl. PCT/US2016/041863.

* cited by examiner

MICROTRANSPORTERS

CROSS-REFERENCE TO RELATED APPLICATIONS

This patent application claims priority to and all advantages of U.S. Patent Application No. 62/311,514, which was filed on Mar. 22, 2016, which is hereby incorporated by reference in its entirety.

BACKGROUND

Moving bulky or heavy packages to and from a vehicle can be difficult without equipment such as dollies and handtrucks. Such equipment can be bulky and consume significant space in a vehicle, compromising the vehicle's load carrying capacity.

DETAILED DESCRIPTION

Introduction

A disclosed microtransporter has at least three wheels supporting a support surface.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described.

Exemplary System Elements

Figure 1:
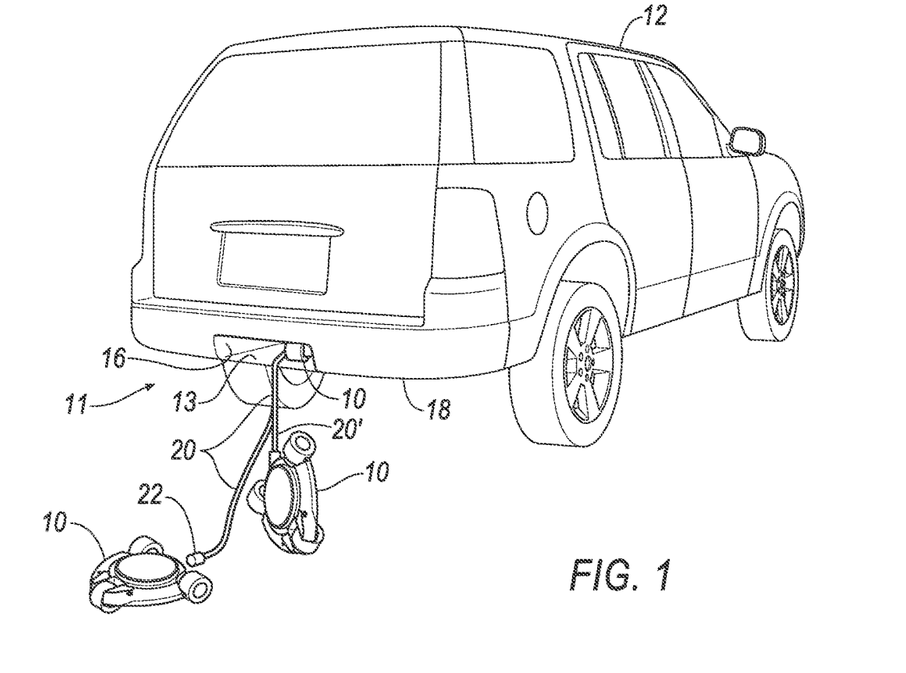
FIG. 1 is a perspective view of an exemplary microtransporter being unloaded from a vehicle's microtransporter storage chamber.

FIG. 1 illustrates an exemplary microtransporter system 11 including a plurality of microtransporters 10 and a housing 13. Multiple exemplary microtransporters 10 are shown being discharged from a vehicle 12 in an exemplary manner. The scale of microtransporter 10 relative to the scale of vehicle 12 can vary from that illustrated, with microtransporter 10 being either comparatively larger or smaller. Illustrated microtransporters 10 are shown exiting a microtransporter storage chamber 14 of housing 13. Exemplary housing 13, best shown in FIG. 5, includes a passageway 16 aligned with an opening in a vehicle bumper 18. An alternative embodiment of chamber 14 suited for aftermarket sales is not integrated into the vehicle, and can be selectively moved to any chosen location. Such a location could include the bed of a pickup truck, as well as the floor of a warehouse. A selectively operable closure, not shown, closes passageway 16 when microtransporters 10 are not in use, restricting the entry of unwanted debris into chamber 14 and preventing the untended loss of any of the contents of chamber 14. An exemplary vehicle-to-microtransporter charging tether 20 includes a plurality tether extensions 20', each with an exemplary charging connector 22 or plug 22 selectively and electrically connected to microtransporters 10. Tether extensions 20' are formed as part of tether 20 and in one exemplary embodiment are spliced into tether 20. A lead end of tether 20 may connect directly to a lead transporter 10 without a need for an extension 20'.

Microtransporter 10 has a rigid base structure 24 formed of any suitable material, including aluminum, steel and composite materials such as carbon-fiber reinforced plastic. Exemplary structure 24 has a substantially triangular shape when view from above, as particularly seen in FIG. 3, as well as in FIG. 2.

Figure 2:
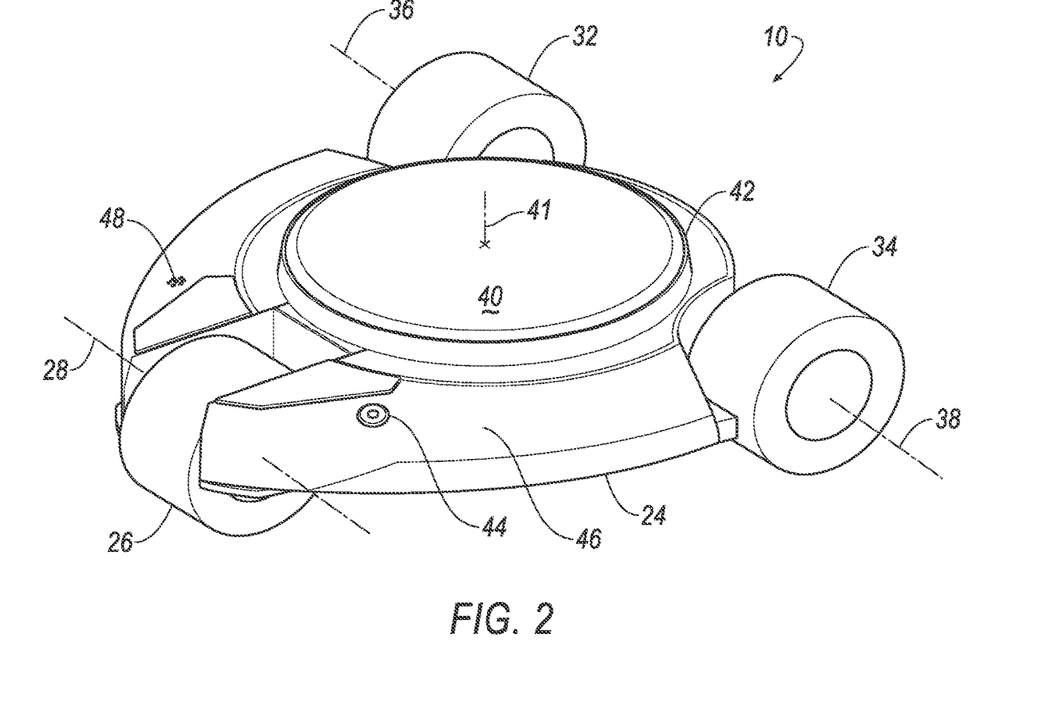
FIG. 2 is a perspective view of the microtransporter of FIG. 1.
Figure 3:
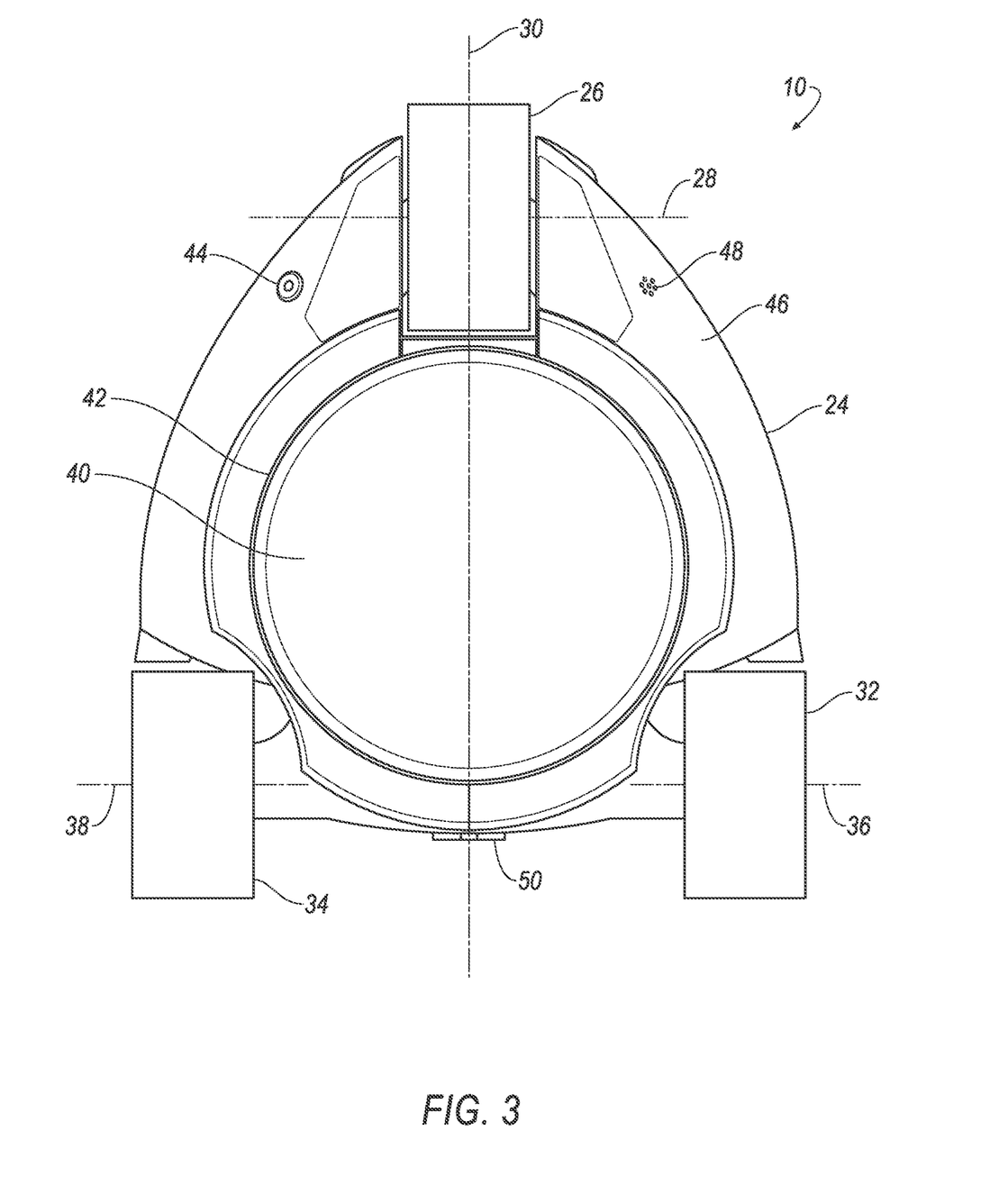
FIG. 3 is a top view of the microtransporter of FIG. 1.

Structure 24 is supported by a plurality of wheels. Exemplary microtransporter 10, with its substantially triangular shape, has three wheels, with one at each corner. In a steering-neutral condition, all of the wheels are substantially parallel to each other to allow unrestricted rolling in a single direction. An exemplary first or front wheel 26, in its exemplary orientation, has an axis of rotation 28 normal to a centerline 30. Centerline 30 passes through wheel 26 and substantially bisects microtransporter 10. Second and third wheels 32 and 34, or collectively back wheels 32 and 34 are disposed at the remaining corners, and are evenly spaced from line 30. In the steering-neutral condition, axes 36 and 38 of back wheels 32 and 34 are substantially parallel to axis 28. An exemplary material for forming at least an outer portion or tire portion of wheels 26, 32, and 34 is rubber. Front wheel 26 is driven by an electric motor, an exemplary motor being a bi-directional electric wheel hub motor (not shown), to facilitate forward and backward movement. In an alternative embodiment, all three wheels can be powered by separate bi-directional electric wheel hub motors. Back wheels 32 and 34, which are alternatively called trailing wheels, are independently steerable to effect the turning of microtransporter 10. An electro-mechanical steering linkage (not shown) is disposed between each of wheels 32, 34 and structure 24. An exemplary steering linkage for one of the wheels 32 and 34 includes a steering knuckle pivotably mounted by a pinned joint for pivoting about an axis normal to the load support surface to which wheel 32 or 34 is rotatably mounted. The linkage further includes, for each of the back wheels, an electric steering motor in the form of an electric stepper motor driving a pinion gear drivingly engaging a toothed steering rack connected to the steering knuckle. Alternatively, the steering motor could be connected directly to the kingpin at an axis of the pinned joint. The exact configuration of the steering linkage is not critical to the present disclosure. In an alternative embodiment, wheel 26 is also steerable. As a further alternative, back wheels 32 and 34 may be driven by electric motors incorporated into wheels 32 and 34. Front wheel 26 may be allowed to pivot. Steering may be achieved by selectively differentiating the relative speed of wheels 32 and 34.

Figure 4:
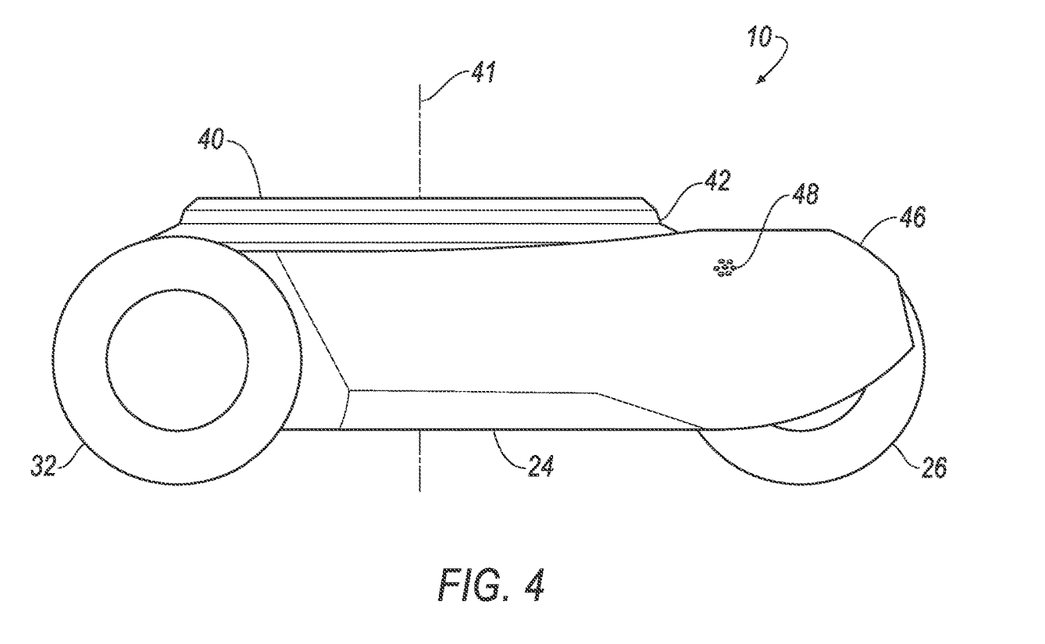
FIG. 4 is a side view of the microtransporter of FIG. 1.

A load support surface 40 is disposed over and substantially centered with centerline 30 and between wheels 26, 32, and 34. This location reduces a risk of microtransporter 10 tipping when a load is placed on support surface 40. Surface 40 is axially fixed to base structure 24, but is rotatable relative to base structure 24 about a surface pivot axis 41 that is normal to surface 40. Exemplary microtransporter 10 includes a bearing (not shown) disposed between surface 40 and base structure 24 that defines pivot axis 41 and facilitates rotation of surface 40 relative to base structure 24. Surface 40 extends above a height or diameter of wheels 26, 32 and 34, eliminating or at least reducing any likelihood that an object supported on load surface 40 will interfere with the rotation of any of wheels 26, 32, 34. In an alternative embodiment, guard covers could be placed over wheels to provide additional protection against possible contact of the object against the wheels. Exemplary load surface 40 is alternatively formed of a polymer, or has a coating of a polymer. The chosen type of polymer is selected to reduce any risk of scratching any object disposed on it, and also to provide a high coefficient of friction, at or substantially near 1.0. The high coefficient of friction reduces the chances of the object or load disposed on microtransporter 10 accidentally sliding off of surface 40. Load support surface 40 can have its shape, size, and coefficient of friction varied to suit particular applications.

Microtransporters 10 each constitute a distinct and discrete element within a larger system. An identification or ID ring 42 is disposed outside of and circumscribes load support surface 40. ID ring 42 incorporates an identifying color used to visually distinguish each microtransporter 10 from each other microtransporter 10 associated with a vehicle 12. An alternative embodiment incorporates a force sensor into a lower mounting point of the load support surface 40. The force sensor supports several improvements in functionality including: detecting an overload condition; making the microtransporter 10 steer in response to a shifting of weight, thereby allowing a person to steer the microtransporter while standing on it; and detecting if the microtransporter is upside down, and resting on its support surface 40.

A camera 44 is disposed on a superior or upper surface 46 of base structure 24. Camera 44, by means of it mounting, is oriented in a direction that is partially upward, partially forward and partially to one side. It has a field of vision of approximately 180°. Alternative embodiments include multiple cameras 44 for a wider field of vision and to also enable a more accurate determination of distances using camera data. A speaker 48 is also disposed on upper surface 46. Camera 44 is used to aid in positioning microtransporter 10. Speaker 48 provides audible feedback signals to an operator of the microtransporter.

An exemplary first charging connector 50 or receptacle is located on a back surface of structure 24. Connector 50, in an exemplary embodiment, includes an electro-magnet which, when energized, maintains plug 22, alternatively the second charging connector 22, in engagement with connector 50. Connectors 22 and 50 are complementary in their respective configurations to facilitate engagement. By way of example, engagement may be in the form of mating engagement with one of connectors 50 and 22 fitting inside the other, or may alternatively be achieve by flush contact of one against the other to achieve a desired electrical communication path. Engagement of exemplary connector 22 in the form of plug 22 with connector 50 provides an electrical connection which enables the communication of electrical power through connector 50. Alternatively, the electro-magnet is disposed in plug 32. Yet alternatively, electro-magnets are disposed in each of connector 50 and plug 32. Yet again alternatively, electro-magnets are disposed in one of connector 50 and plug 32, with permanent magnets being disposed in the other of connector 50 and plug 32. A field reversal of the electro-magnets alternatively causes the connector 50 and plug 32 to attach or to repel. One benefit of using electro-magnets over permanent magnets is that electro-magnets are less likely to pick up and retain ferrous debris on the plug engagement surface than are permanent magnets.

Microtransporter 10 further includes additional electronic componentry that is electrically connected to each of connector 50, speaker 48, camera 44, the drive motor associated with front wheel 26 and the steering motors associated with back wheels 32 and 34. An electric power accumulator, by way of example a lithium-ion battery or a supercapacitor or an ultracapacitor, is used to store electrical power received through connector 50, and provides electrical power to the electrical components on board microtransporter 10. An electronic control unit (ECU), essentially a computer comprising at least one processor with an associated memory, is also included in microtransporter 10. The memory includes one or more forms of computer-readable media, and stores instructions executable by the processor for performing various operations, including such operations as disclosed herein. Speaker 48, camera 44, the drive motor associated with front wheel 26 and the steering motors associated with back wheels 32 and 34 are all electrically connected with the ECU. Such connections may be provided by wires or wireless systems operating on a wireless protocol such as Bluetooth. A wireless system allows at least one channel of communication between the ECU and devices remote from microtransporter 10, particularly portable digital devices including by way of example personal computers, mobile phones, and other microtransporters 10.

Each microtransporter 10 is assigned a distinct digital address or identity relative to the other microtransporters 10 associated with the vehicle 12. Each address corresponds to and is associated with the color of the ID ring 42 of the respective microtransporter 10. In an alternative embodiment, ID ring 42 can have its color changed responsive to predetermined conditions. Such color changes may be achieved through the use of light emitting diode rings (LED rings) selectively providing a predetermined color with the selected color, in turn providing another channel of communications with the operator. For example, once the transporters 10 are at the ideal position for a load to be placed upon the transporters 10, the rings 42 could all turn green.

Figure 5:
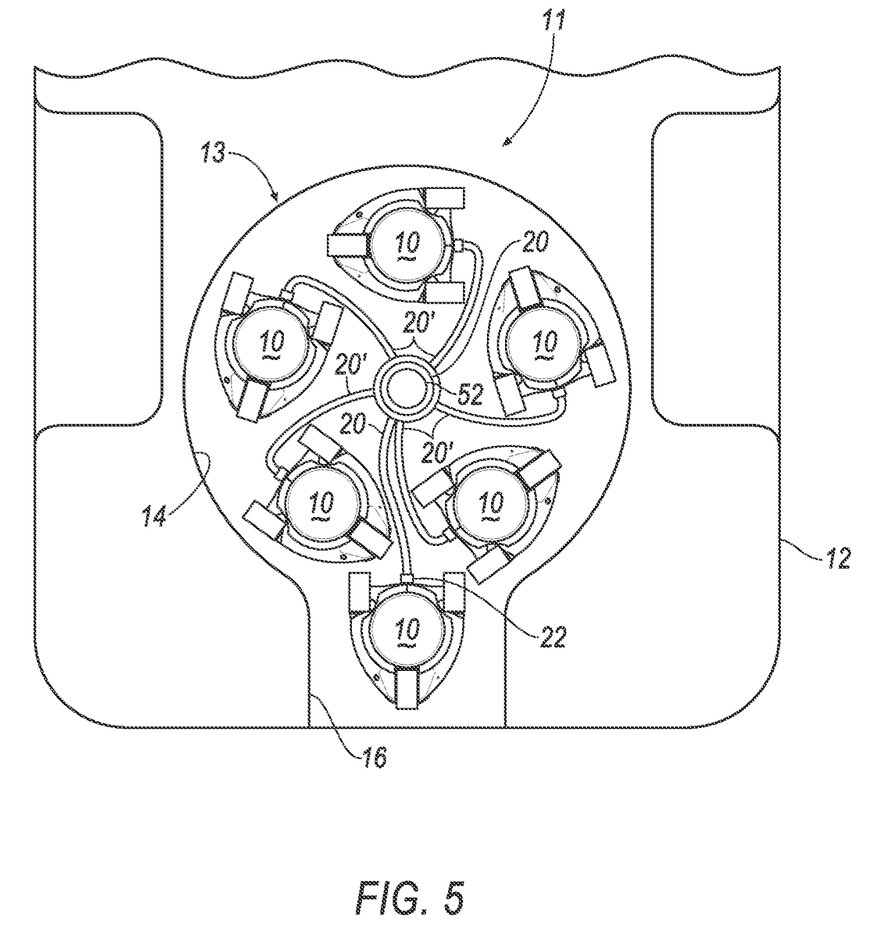
FIG. 5 is a top section view of a rear portion of the vehicle of FIG. 1 illustrating the storage chamber.

The number of charging plugs 22 on tether 20, including those on extensions 20', equals the number of microtransporters associated 10 with vehicle 12. Tether 20 includes both an electrical power conductor and a structural strap element with the conductor electrically connected to the plugs 22. The electrical conductor is at least selectively connected with an electrical power source such as the vehicle's battery. Tether 20 has a free end and a fixed end. The fixed end is fixedly disposed within storage chamber 14, connecting to an exemplary cylindrical rotatable spool 52. Spool 52 rotates in a first direction to wind tether 20 around itself and in a second direction to unwind tether 20. Tether 20 may wrap around spool 52 in multiple layers. In a first condition, associated with having the microtransporters 10 disposed within chamber 14, tether 20 is entirely disposed within housing 11. In a second condition, associated with both the discharge and recovery of microtransporters 10, tether 10 may be in part disposed outside of housing 13, with the fixed end disposed within chamber 14 and connected to spool 52 as noted above.

Processing

In operation, microtransporters 10, as best seen in FIG. 1, are discharged or removed from storage chamber 14 via passageway 16 and the associated opening in bumper 18. As microtransporters 10 are evacuated from storage chamber 14, each has its charging plug connector 50 separated from the associated charging plug of tether 20 as the microtransporter reaches the ground below vehicle 10. In an exemplary unloading sequence, as the tether 20 is unwound by the rotating spool 52, a lead microtransporter 10 at the free end of tether 20 self-navigates toward and out of the passageway 16, dangling by the tether 20 from the passageway over the ground. As the tether 20 continues to unwind, the microtransporter 10 approaches the ground. As the connector 50-plug 22 interface is at a back of microtransporter 10, the ground approach orientation of the microtransporter is in a front-wheel-down orientation. Using its camera, 44, microtransporter 10 rotates front wheel 26 in a forward driving direction prior to wheel 26 making contact with the ground. As wheel 26 contacts the ground, microtransporter 10 moves in the direction dictated by the rotation of the moving wheel 26. When microtransporter 10 has all three wheels on the ground or nearly so, the electromagnetic force at the plug-connecter interface is deactivated or released, disconnecting microtransporter 10 from tether 20 in an upright position. Microtransporter 10 then autonomously proceeds to an initial marshalling area in either a predetermined default location relative to the vehicle 12, or to a marshalling location determined by the operator. The cross-sectional shape of tether 20 and the orientation of connector 50 on tether 20 both contribute to positively controlling the orientation of microtransporters 10 when they contact the ground to increase the likelihood that the initial direction of the microtransporter will be in a pre-determined direction, such as away from the vehicle 12. Exemplary tether 20 has a flat side and an opposed arcuate side. Tether 20 rolls to the flat side when forced to slide over an edge like that associated with a drop-off from the passageway 16. Connectors 50 extend from the arcuate side of tether 20.

In the unlikely event that a microtransporter 10 is turtled, or lands on its load support surface 40, it will be disconnected from tether 20 as if it was on its wheels to avoid delaying deployment of the other microtransporters 10. The upside-down or turtled microtransporter 10 can be flipped over by the operator, or, if so equipped, can use a self-righting feature. An exemplary self-righting feature includes a hinged panel on an upper surface of base structure 24 connected to an actuator that rapidly actuates or displaces the panel from a resting position against structure 24 to a displaced position away from the structure. Rapid actuation simultaneously imparts an upward displacement and a rotational displacement of microtransporter 10, flipping microtransporter 10 over to its correct, upright position.

Once on the ground in a right-side-up orientation, microtransporters 10 are positioned as best suited to support the package to be moved. For example, with a long, relatively thin package, such as box containing a large, flat-screen video monitor, two microtransporters 10 would be appropriate. Alternatively, for a large potted plant, three microtransporters 10 would be more appropriate. Yet further, a large heavy package, for example a package that is one meter long on each side and weighs 50 kilograms, is best supported by four microtransporters 10, so long as the package is sufficiently rigid. In cases where the package is not sufficiently rigid, it may be desirable to place beams or a pallet between the package and the microtransporters 10.

When presented with a package, microtransporters 10 use their respective cameras 44 to first recognize a package and to then assess the size and shape of the package. Microtransporters 10 communicate with each other to position themselves under the package as the package is being lowered into place. Management of positioning of microtransporters 10 is supplemented with the use of a linked communication device such as a smart phone (not shown) held by the operator. A smart-phone application ("phone app") allows the operator to move selected microtransporters to positions chosen by the operator. The microtransporters are distinguished by their respective ID rings 42 by the operator and the associated digital address by the phone app, allowing the operator to manage each microtransporter separately. The operator may selectively employ an optical sensing input command system in which the microtransporter uses its camera to recognize hand signals from the operator as positioning instructions. The micro transporters will provided feedback to the operator via digital communications through the phone app, or audible communications in the form of words or other recognizable signals including beeps or whistles.

Microtransporters 10 may be programmed to be semiautonomous in operation. Semiautonomous performance functions may include discharging from the housing 13 in an up-right position as described above, automated marshalling in an area proximate to the housing 13 and the vehicle 12 both immediately after discharge and upon completing a particular task, selecting and navigating a path from a first location to a second location specified by an operator, and positioning itself proximate to a connector 22 so that the connector 50 can be engaged by connector 22.

One embodiment of the microtransporter 10 designates one microtransporter as a master unit. The master unit is programmed to monitor and provide directions to the other microtransporters. The directions may be default directions stored in the memory of the master unit, or operator-specified directions sent to the master unit by the operator. To facilitate this function, the master unit is the microtransporter associated with the end of tether 20 and is thus the first microtransporter discharged from passageway 16 and the last one back through passageway 16.

Once the package is adequately supported by the microtransporters, the microtransporters are used to move the package in either a passive mode or an active mode. In the passive mode, the microtransporters serve as casters, rolling in whatever direction the operator physically directs the package. In the active mode, the microtransporters drive motors move the package in accord with directions provided by the operator through the phone app.

Upon completing the task at hand, and upon the package being lifted from the microtransporters 10, the microtransporters 10 return under their own power to a location proximate to vehicle 12. The technology used for establishing the position of the vehicle is not critical to the present disclosure. Suitable exemplary technologies include Global Position System data acquisition, and, alternatively, broadcasting radio frequency signals from the vehicle that are received by the microtransporters such as wireless local area networks. Once the microtransporters 10 have returned to vehicle 12, tether 20 is dispensed from passageway 16. Microtransporters 10 direct themselves to plugs 22, placing their connectors 50 proximate to plugs 22. The electromagnets in the connectors 50 are energized to couple plugs 22 to connectors. Once the microtransporters are connected to tether 20, the spool rotates, drawing the coupled microtransporters 10 up, through the passageway, and into the storage chamber. Microtransporters 10 may use their electric motors and steering to position themselves within chamber 14.

CONCLUSION

An exemplary microtransporter system 11 including a plurality of microtransporters 10 and a housing 13 and a method for using the same have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to computers in the present description, computing devices such as those discussed herein generally each include instructions executable by one or more computing devices such as those identified above, and for carrying out blocks or steps of processes described above. For example, process blocks discussed above are embodied as computer executable instructions.

Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the processes, systems, methods, etc. described herein, it should be understood that, although the steps of such processes, etc. relating to the deployment and use of microtransporters have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A microtransporter system comprising:
   a plurality of microtransporters, each including:
      a rigid base structure,
      three wheels rotatably mounted in the base structure,
      an electric motor drivingly connected to one of the wheels, and
      a load support surface connected to the base structure; and
   a housing including:
      a storage chamber sized to store a plurality of microtransporters, and
      a passageway connecting the chamber to an outside of the housing, wherein the housing is adapted for mounting in a motor vehicle such that the passageway connects to an opening in a rear bumper of the vehicle.

2. The microtransporter system of claim 1, wherein each microtransporter further comprises a first charging connector fixed to the base structure.

3. The microtransporter system of claim 2, including a charging tether having a first end disposed in the storage chamber and having a plurality of second charging connectors complementary to the first charging connectors and selectively engageable with the first charging connector of one of the microtransporters.

4. The microtransporter system of claim 1, wherein each microtransporter further comprises an identifying color marking.

5. The microtransporter system of claim 1, wherein at least one of the microtransporters further comprises a speaker integrated into the microtransporter.

6. The microtransporter system of claim 1, wherein at least one of the microtransporters further comprises a camera integrated into an upper surface of the base structure.

7. The microtransporter system of claim 6, further comprising a second camera integrated into the upper surface of the base structure.

8. The microtransporter system of claim 1, further comprising:
   the microtransporters including a first charging connector fixed to the base structure; and
   a charging tether disposed in the storage chamber in a first condition and having a first end fixed within the storage chamber and having a plurality of second charging connectors selectively engageable with the first charging connectors of the microtransporters.

9. The microtransporter system of claim 8, wherein the tether extends through the passageway in a second condition.

10. The microtransporter system of claim 9, wherein at least one microtransporter engaged by the tether and is suspended from the vehicle by the tether with the tether in the second condition.

11. The microtransporter system of claim 3, wherein the first charging connector and the second charging connector each have a magnet engaging the first charging connector and the second charging connector.

12. The microtransporter system of claim 11, wherein at least one of the magnets is an electromagnet.

13. The microtransporter system of claim 11, wherein the tether to microtransporter engagement has sufficient strength to suspend the microtransporter above ground from the tether.

14. A method of operating a microtransporter system comprising:
    providing a plurality of microtransporters, each including:
        a rigid base structure,
        three wheels rotatably mounted in the base structure,
        an electric motor drivingly connected to one of the wheels, and
        a load support surface connected to the base structure; and
    providing a housing including:
        a storage chamber sized to store a plurality of microtransporters, and
        a passageway connecting the chamber to an outside of the housing,
    wherein the housing is adapted for mounting in a motor vehicle such that the passageway connects to an opening in a rear bumper of the vehicle;
    discharging a one of the microtransporters from the housing;
    positioning the microtransporter to a preferred location outside of the housing;
    placing a load on the microtransporter; and
    guiding the microtransporter and the load to a second location.

15. The method of operation of claim 14, further comprising:
    discharging a plurality of microtransporters from the housing;
    positioning the microtransporters into a preferred pattern in a preferred location outside of the housing.

16. The method of operation of claim 14, further comprising:
    providing a first charging connector fixed to the base structure of the microtransporters;
    providing a tether having a first end disposed in the storage chamber and having a plurality of second charging connectors selectively engageable with the first charging connectors;
    discharging the microtransporters from the housing; and
    disconnecting the tether from the microtransporter after the microtransporters have been discharged from the housing.

17. The method of claim 16, further comprising the steps of:
    mounting the housing in a motor vehicle; and
    providing the tether to microtransporter engagement with sufficient strength to suspend the microtransporter above ground from the tether.

18. The method of claim 17, further comprising the steps of:
    directing the microtransporters to self-connect to the tether connectors;
    withdrawing the tether into the housing, lifting microtransporters up and into the passageway; and
    moving the microtransporters to a parked position within the housing.

* * * * *